(12) United States Patent
Ogawa et al.

(10) Patent No.: US 8,951,931 B2
(45) Date of Patent: Feb. 10, 2015

(54) NOBLE METAL FINE PARTICLE SUPPORTED CATALYST AND METHOD FOR PRODUCING THE CATALYST, AND PURIFYING CATALYST

(75) Inventors: Ryohei Ogawa, Tokyo (JP); Kiyoshi Miyashita, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 121 days.

(21) Appl. No.: 13/581,866

(22) PCT Filed: Feb. 28, 2011

(86) PCT No.: PCT/JP2011/001165
§ 371 (c)(1),
(2), (4) Date: Aug. 30, 2012

(87) PCT Pub. No.: WO2011/108250
PCT Pub. Date: Sep. 9, 2011

(65) Prior Publication Data
US 2012/0329643 A1    Dec. 27, 2012

(30) Foreign Application Priority Data
Mar. 2, 2010   (JP) .................................. 2010-045524

(51) Int. Cl.
*B01J 8/00*    (2006.01)
*B01J 8/02*    (2006.01)
(Continued)

(52) U.S. Cl.
CPC ............... *B01J 23/40* (2013.01); *B01D 53/944* (2013.01); *B01J 21/063* (2013.01);
(Continued)

(58) Field of Classification Search
USPC ......... 502/182, 185, 240, 242, 261, 304, 327, 502/332, 350; 423/213.5, 239.1
See application file for complete search history.

(56) References Cited

U.S. PATENT DOCUMENTS 2,758,128 A  *  8/1956  Schenk et al. ................ 518/713
3,928,239 A     12/1975  Yonehara et al.
(Continued)

FOREIGN PATENT DOCUMENTS

EP    1 952 876    8/2008
EP    2 022 562    2/2009
(Continued)

OTHER PUBLICATIONS

Namba et al. "Colloidal platinum—Preparation and application". *Front face*, vol. 21, No. 88, pp. 450-456, 1983, and partial English translation.

*Primary Examiner* — Patricia L Hailey
(74) *Attorney, Agent, or Firm* — Hamre, Schumann, Mueller & Larson, P.C.

(57) ABSTRACT

The noble metal fine particle supported catalyst of the present invention includes a substrate, and a porous membrane formed on the substrate. The porous membrane contains support particles, noble metal fine particles, and an inorganic binder. In the porous membrane, the noble metal fine particles are supported on surfaces of the support particles, and the support particles form secondary particles each having a porous structure. The porous membrane is formed by binding, with the inorganic binder, the secondary particles formed of the support particles so that a gap is present at least partly between the secondary particles adjacent to each other.

19 Claims, 5 Drawing Sheets

(51) Int. Cl.

| | | |
|---|---|---|
| *B01J 21/00* | (2006.01) | |
| *B01J 21/18* | (2006.01) | |
| *B01J 23/00* | (2006.01) | |
| *B01J 23/10* | (2006.01) | |
| *B01J 23/40* | (2006.01) | |
| *B01J 23/42* | (2006.01) | |
| *B01J 23/56* | (2006.01) | |
| *B01J 23/74* | (2006.01) | |
| *B01D 53/56* | (2006.01) | |
| *B01D 53/86* | (2006.01) | |
| *B01D 53/94* | (2006.01) | |
| *C01B 21/00* | (2006.01) | |
| *C01B 23/00* | (2006.01) | |
| *C01B 25/00* | (2006.01) | |
| *C01B 31/00* | (2006.01) | |
| *C01B 33/00* | (2006.01) | |
| *C01B 35/00* | (2006.01) | |
| *C01G 28/00* | (2006.01) | |
| *C01G 30/00* | (2006.01) | |
| *B01J 21/06* | (2006.01) | |
| *B01J 35/00* | (2006.01) | |
| *B01J 35/04* | (2006.01) | |
| *B01J 37/03* | (2006.01) | |
| *C02F 1/72* | (2006.01) | |
| *H01M 4/92* | (2006.01) | |
| *H01M 4/86* | (2006.01) | |
| *H01M 4/88* | (2006.01) | |

(52) U.S. Cl.
CPC ............ *B01J 35/0013* (2013.01); *B01J 35/04* (2013.01); *B01J 37/038* (2013.01); *C02F 1/725* (2013.01); *H01M 4/92* (2013.01); *H01M 4/8605* (2013.01); *H01M 4/8814* (2013.01); *H01M 4/8828* (2013.01); *H01M 4/8842* (2013.01); *H01M 4/925* (2013.01); *H01M 4/926* (2013.01); *B01D 2253/304* (2013.01); *B01D 2255/1021* (2013.01); *B01D 2255/1023* (2013.01); *B01D 2255/1026* (2013.01); *B01D 2255/106* (2013.01); *B01J 21/06* (2013.01); *Y02E 60/50* (2013.01)
USPC ............ 502/182; 502/240; 502/242; 502/261; 502/304; 502/327; 502/332; 502/350; 423/213.5; 423/239.1

(56) References Cited

U.S. PATENT DOCUMENTS

| | | | |
|---|---|---|---|
| 4,289,746 A * | 9/1981 | Hayakawa et al. | 423/633 |
| 7,199,077 B2 * | 4/2007 | Hu et al. | 502/325 |
| 7,220,366 B2 * | 5/2007 | Uegami et al. | 252/181 |
| 7,648,938 B2 * | 1/2010 | Miyashita et al. | 502/182 |
| 7,754,644 B2 * | 7/2010 | Ogawa | 502/185 |
| 7,759,281 B2 | 7/2010 | Kezuka et al. | |
| 8,119,075 B2 * | 2/2012 | Dettling et al. | 422/180 |
| 2004/0009871 A1 * | 1/2004 | Hu et al. | 502/338 |
| 2006/0062108 A1 * | 3/2006 | Muthu | 369/44.34 |
| 2006/0144189 A1 | 7/2006 | Miyashita et al. | |
| 2009/0111684 A1 * | 4/2009 | Demirel et al. | 502/158 |

FOREIGN PATENT DOCUMENTS

| | | | |
|---|---|---|---|
| EP | 2 055 365 | 5/2009 | |
| EP | 2 308 595 | 4/2011 | |
| EP | 2 311 559 | 4/2011 | |
| JP | 10-76159 | 3/1998 | |
| JP | 10-249198 | 9/1998 | |
| JP | 2000-317313 | 11/2000 | |
| JP | 2000-328927 | 11/2000 | |
| JP | 2002-191988 | 7/2002 | |
| JP | 2002-316049 | * 10/2002 | ............... B01J 23/63 |
| JP | 2003-135963 | 5/2003 | |
| JP | 2003-262599 | 9/2003 | |
| JP | 2004-100040 | 4/2004 | |
| JP | 2005-111336 | 4/2005 | |
| JP | 2005-199204 | 7/2005 | |
| JP | 2006-81957 | 3/2006 | |
| JP | 2009-515680 | 4/2009 | |
| JP | 2011-36834 | 2/2011 | |

* cited by examiner

NOBLE METAL FINE PARTICLE SUPPORTED CATALYST AND METHOD FOR PRODUCING THE CATALYST, AND PURIFYING CATALYST

TECHNICAL FIELD

The present invention relates to a noble metal fine particle supported catalyst used for, for example, purifying a fluid such as exhaust gas and wastewater, and a method for producing the catalyst. The present invention also relates to a purifying catalyst for purifying exhaust gas or wastewater, including the noble metal fine particle supported catalyst.

BACKGROUND ART

A noble metal fine particle supported catalyst in which noble metal fine particles (for example, noble metal colloids described in Patent Literature 1 and Nonpatent Literature 1) that are finely made and each have a particle diameter of about several nanometers are supported on a ceramic material, a carbon material, a metal material or an organic polymer material is used for treating a fluid such as exhaust gas and wastewater.

For example, a conductive catalyst obtained by allowing noble metal fine particles to be supported on carbon powder that is a carbon material is used as an electrode material for a fuel cell. A catalyst obtained by allowing noble metal fine particles to be supported on a ceramic material is used as a exhaust gas purifying catalyst for decomposing components (such as hydrocarbon (HC), carbon monoxide (CO), and a nitrogen oxide ($NO_x$)) contained in high temperature exhaust gas emitted from an internal combustion engine such as an automobile engine, or as a reforming catalyst for generating hydrogen from a fuel, such as alcohol, inside a reformer of a fuel cell. There is also a case where a noble metal fine particle supported catalyst is used as a decomposing catalyst for decomposing environmental toxic substances contained in industrial wastewater, etc.

In a noble metal fine particle supported catalyst, a contact reaction in which a reaction proceeds on surfaces of noble metal fine particles is accelerated. Thus, the catalytic activity of the noble metal fine particle supported catalyst is enhanced in proportion to the surface area of the noble metal fine particles. Therefore, in order to enhance the catalytic activity of the noble metal fine particle supported catalyst, it is effective to use noble metal fine particles that are finely made and have a uniform particle diameter by controlling the particle diameter of the noble metal fine particles. That is, when noble metal fine particles each having a particle diameter of about several nanometers are supported on a surface of a substrate while the particles are dispersed uniformly, the surface area of the noble metal fine particles is increased, and thereby a noble metal fine particle supported catalyst with high catalytic activity can be obtained.

When the substrate has a porous structure, noble metal fine particles can be supported within the substrate (that is, on surfaces of pores in the porous structure) and on a surface of the substrate (that is, an outer surface of the porous structure). Use of a noble metal fine particle supported catalyst having such a porous structure (noble metal fine particle supported porous catalyst) makes it possible to increase further the surface area of the catalyst that contributes to the contact reaction. As the method for producing the noble metal fine particle supported porous catalyst, a common method is known. For example, methods are known in which a porous membrane formed on a substrate is immersed in a noble metal raw material solution, and then noble metal is precipitated (Patent Literatures 2 and 3). Methods are also known in which granular porous supports on which noble metal is supported is mixed with a solvent to make a slurry, and this slurry is applied and deposited on a substrate (Patent Literatures 4 and 5).

There is also known a case in which for the purpose of enhancing the function of a titanium oxide photocatalyst, titanium oxide fine particles on which noble metal fine particles are supported are further supported on a substrate (Patent Literature 6). In addition, there is also known a method in which for the purpose of enhancing the state of noble metal fine particles being dispersed, noble metal fine particles such as Pt particles, powdery supports composed of a metal oxide such as $Al_2O_3$, and an inorganic binder such as a silica sol are mixed together, and a resultant mixture is applied to a substrate, the applied coating is dried and sintered to form a coating membrane on the substrate (Patent Literature 7). There is also known a method in which, for the same purpose, a noble metal colloid (noble metal fine particles) prepared using a reversed micelle process, a metal hydroxide prepared using a reversed micelle process, and a hydrolysate of metal alkoxide are mixed together and a resultant mixture is sintered (Patent Literature 8).

CITATION LIST

Patent Literature

PTL 1: JP 2004-100040 A
PTL 2: JP 2002-191988 A
PTL 3: JP 2003-262599 A
PTL 4: JP 2000-328927 A
PTL 5: JP 2003-135963 A
PTL 6: JP 2005-1992.04 A
PTL 7: JP 10 (1998)-076159 A
PTL 8: JP 2005-111336 A

Nonpatent Literature

NPL 1: MAMBA Seitaro and OKURA Ichiro, "Colloidal platinum—Preparation and application", Front Face, 1983, Vol. 21, No. 8, pp. 450 to 456

SUMMARY OF INVENTION

Technical Problem

However, with the conventionally-known methods for producing noble metal fine particle supported catalysts, it is difficult to control the state of the noble metal fine particles being supported. Therefore, the conventional noble metal fine particle supported catalysts obtained by these methods cannot exhibit sufficient catalytic activity in some cases.

For example, in the case of using the method in which a porous membrane is immersed in a noble metal raw material solution and noble metal fine particles are precipitated, the adsorption of noble metal ions to the porous membrane is susceptible to the surface state of the porous membrane. Accordingly, the state of the noble metal fine particles being dispersed is worsened depending on the surface state of the porous membrane. In such a case, the precipitated noble metal fine particles each may have to large particle diameter. That is, a noble metal fine particle supported catalyst with high catalytic activity may not be obtained. Furthermore, noble metal fine particles are not precipitated inside the pores of the porous membrane but are precipitated only on the surface of the porous membrane, depending on the pore diameter and thickness of the porous membrane. In such a case, the large surface area of the porous membrane cannot be utilized effectively. Moreover, it is difficult to support a plural types of noble metal fine particles at the same time. Also, components other than the noble metal contained in the noble metal raw material solution may not be removed but remain in the catalyst.

There is a problem also with the method in which granular porous supports on which noble metal fine particles are supported is made into a slurry, and this slurry is deposited on a substrate. That is, in some cases, only the noble metal fine particles supported on the porous supports in the vicinity of the outermost surface of the noble metal fine particle supported catalyst obtained by this method can be in contact with a target material to be treated, and only these noble metal fine particles can contribute substantially to the reaction. In such a case, in the noble metal fine particle supported catalyst, the noble metal contained in the noble metal fine particle supported catalyst has a lower catalytic activity per unit amount.

There is a problem also with the method in which noble metal fine particles are prepared, and then the noble metal fine particles, support particles, and an inorganic binder are mixed together, and a resultant mixture is applied to a substrate and sintered to form a coating. That is, depending on the state of the noble metal fine particles being dispersed in the obtained coating, a part of the noble metal fine particles cannot be in contact with the target material to be treated and the catalytic activity is lowered substantially. Moreover, in the case of employing this method, there may arise a problem of precipitation of the noble metal fine particles (the noble metal fine particles are aggregated in the process of membrane formation because the noble metal fine particles are not fixed to the support particles, and the aggregated noble metal fine particles are fusion-bonded to each other depending on the sintering temperature, both of which cause a problem that the catalytic activity is lowered). There is also the same problem with the method in which a noble metal colloid (noble metal fine particles) prepared using a reversed micelle process, a metal hydroxide prepared using a reversed micelle process, and a hydrolysate of metal alkoxideare mixed together and a resultant mixture is applied to a substrate and sintered.

An object of the present invention is to provide a noble metal fine particle supported catalyst with high catalytic activity, in which noble metal fine particles are supported on a porous membrane having a structure with fine asperities, and in which the noble metal fine particles are supported uniformly on a surface of the porous membrane and inside pores of the porous membrane.

Another object of the present invention is to provide a method for producing the noble metal fine particle supported catalyst.

Still another object of the present invention is to provide a purifying catalyst for purifying exhaust gas or wastewater, including the noble metal fine particle supported catalyst.

Solution to Problem

The present inventors allowed noble metal fine particles to be supported on support particles and then bound secondary particles formed of the support particles to each other with an inorganic binder to produce a porous membrane, and laminated the porous membrane on a surface of a substrate. Thereby, the present inventors have found that it is possible to obtain a noble metal fine particle supported catalyst including a porous membrane in which noble metal fine particles with high catalytic activity are dispersed uniformly and which has a large reaction area (that is, many of the noble metal fine particles can be in contact with a target material to be treated). The present inventors have studied further and completed the present invention.

That is, the present invention is a noble metal fine particle supported catalyst including a substrate, and a porous membrane formed on the substrate. The porous membrane contains support particles, noble metal fine particles, and an inorganic binder. In the porous membrane, the noble metal fine particles are supported on surfaces of the support particles, and the support particles form secondary particles each having a porous structure. The porous membrane is formed by binding, with the inorganic binder, the secondary particles formed of the support particles so that a gap is present at least partly between the secondary particles adjacent to each other.

The present invention is also a method for producing a noble metal fine particle supported catalyst, including the steps of: bringing a dispersion of noble metal fine particles into contact with support particles having an average particle diameter of 10 nm to 100 nm to allow the noble metal fine particles to be supported on the support particles; mixing the support particles on which the noble metal fine particles are supported with a solvent and stirring a resultant mixture to produce a dispersion of the support particles so that the support particles form secondary particles having an average particle diameter of 10 nm to 1000 nm; producing a coating liquid by mixing the dispersion of the support particles with a metal oxide forming sol forming an inorganic binder; applying the coating liquid to a substrate; and drying and heat-treating the substrate on which the coating liquid is applied. In the method, a porous membrane containing the noble metal fine particles, the support particles, and the inorganic binder is formed on the substrate by binding, with the inorganic binder, the secondary particles formed of the support particles and adjacent to each other, and binding the support particles to the substrate with the inorganic binder.

The present invention is also a purifying catalyst for purifying exhaust gas or wastewater, including the noble metal fine particle supported catalyst.

Advantageous Effects of Invention

In the noble metal fine particle supported catalyst of the present invention, the support particles on which the noble metal fine particles are supported form the secondary particles each having a porous structure. That is, the noble metal fine particles are supported not only on outer surfaces of the secondary particles but also within the secondary particles. Furthermore, the porous membrane is formed by binding, with the inorganic binder, the secondary particles while a gap is maintained between the secondary particles adjacent to each other. Thus, the noble metal fine particles can be disposed also at portions that are in contact with the gaps present in the porous membrane. Such a configuration allows the noble metal fine particles to be dispersed uniformly in the porous membrane. Also, the porous structure of the secondary particles and the presence of the gaps in the porous membrane make it easy for the noble metal fine particles to be in contact with a target material to be treated. As a result, the noble metal fine particle supported catalyst of the present invention can exhibit high catalytic activity.

In the method for producing the noble metal fine particle supported catalyst of the present invention, the noble metal fine particle supported catalyst is produced by laminating, on the substrate, the support particles on which the noble metal fine particles are supported. That is, the noble metal fine particles are supported on the support particles in advance in the present invention. Therefore, it is easy to control the particle diameter and dispersibility of the noble metal fine particles, the amount of the noble metal fine particles supported, and the composition of the noble metal. Moreover, the concentration of impurities contained in the noble metal fine particles can be extremely low. Furthermore, since the particle diameter of the secondary particles formed of the support particles to be laminated on the substrate is controlled to fall within the range of 10 nm to 1000 nm, it is possible to create a laminated porous structure suitable for the noble metal fine particle supported catalyst, that is, a structure in which a gap is present between the secondary particles adjacent to each other. Therefore, the method of the present invention makes it possible to produce a noble metal fine particle supported catalyst in which the noble metal fine particles within the membrane can be utilized effectively.

Also, the purifying catalyst for purifying exhaust gas or wastewater of the present invention can purify exhaust gas or wastewater properly.

DESCRIPTION OF EMBODIMENTS

Figure 1:
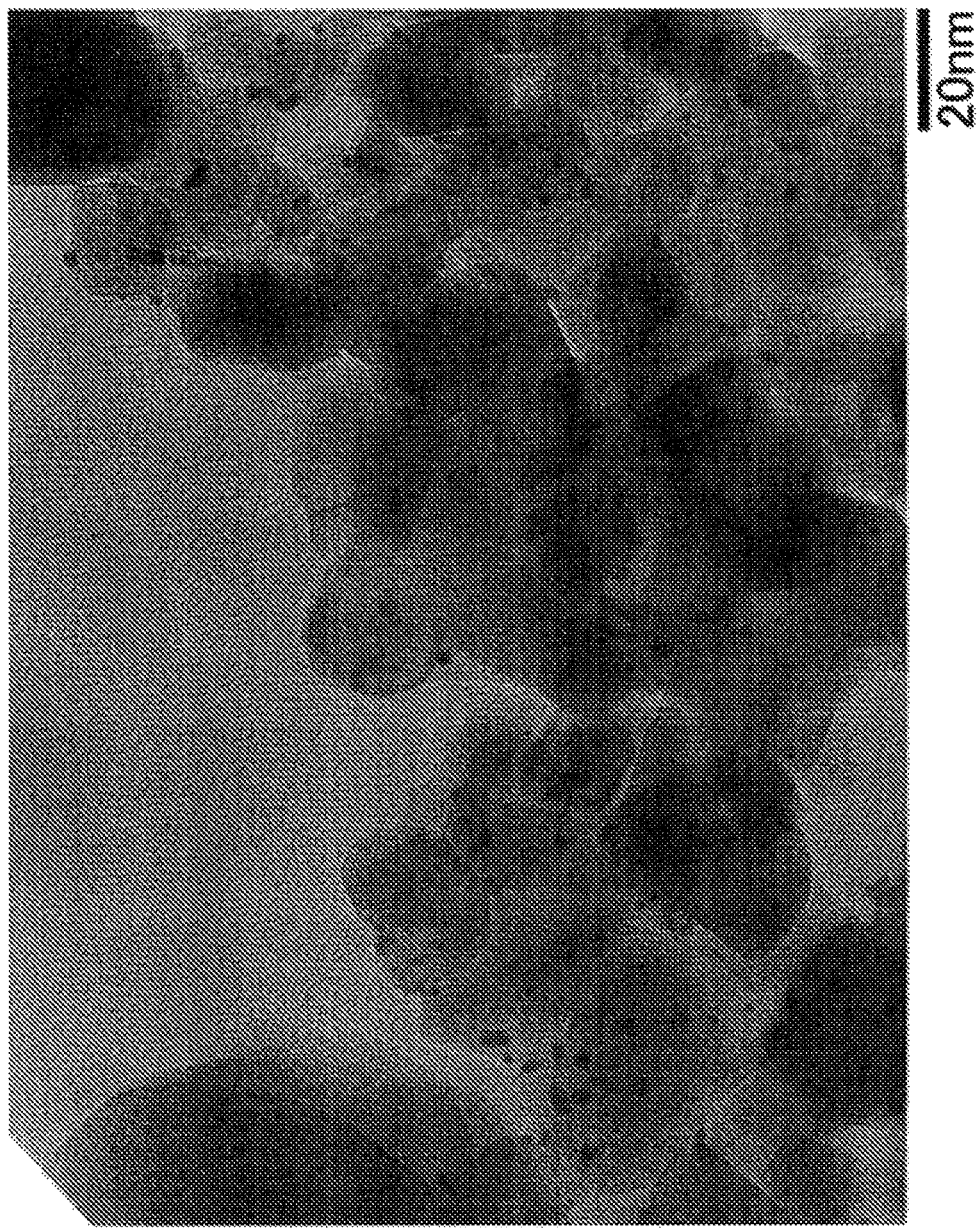
FIG. 1 is an example of a TEM observation image of prepared Pt fine particles.

One embodiment of the noble metal fine particles supported catalyst of the present invention is described. However, the present invention is not limited to this.

The noble metal fine particle supported catalyst of the present embodiment includes a substrate and a porous membrane. The porous membrane is formed on the substrate.

The porous membrane includes noble metal fine particles, support particles (primary particles), and an inorganic binder. The support particles support, on surfaces thereof, the noble metal fine particles. The support particles form secondary particles each having a porous structure. The "secondary particle" is an aggregation of the primary particles. Particularly, in the present embodiment, the "secondary particle" refers to an aggregation of the support particles on which the noble metal fine particles are supported. The "secondary particle having a porous structure" indicates that the secondary particle has fine pores each formed of a gap between the support particles.

More specifically, the porous membrane is formed by binding, with the inorganic binder, the secondary particles so that a gap is present between the secondary particles adjacent to each other.

Preferably, the noble metal fine particles each are composed of at least one selected from the group consisting of platinum (Pt), palladium (Pd), gold (Au), ruthenium (Ru), and rhodium (Rh), and have a particle diameter of 1 nm to 20 nm. It also is preferable that the noble metal fine particles each are composed of an alloy of the metals in the above-mentioned group, or a mixture of these metals. This makes it possible to obtain a noble metal fine particle supported catalyst that exhibits high catalytic activity.

More preferably, the noble metal fine particles each have a particle diameter of 1 nm to 5.5 nm. This makes it possible to obtain a noble metal fine particle supported catalyst that exhibits higher catalytic activity.

Particularly preferably, the noble metal fine particles each are composed of Pt and have a particle diameter of 1 nm to 5.5 nm. This makes it possible to obtain a noble metal fine particle supported catalyst that exhibits particularly higher catalytic activity.

Particularly preferably, the noble metal fine particles each are composed of Pd and have a particle diameter of 5 nm to 15 nm. This also makes it possible to obtain a noble metal fine particle supported catalyst that exhibits particularly higher catalytic activity.

Preferably, the support particles each are composed of at least one selected from the group consisting of titanium oxide, aluminum oxide, cerium oxide, zirconium oxide, silica, and carbon. This makes it easy for the support particles to support the noble metal fine particles. Thereby, a noble metal fine particle supported catalyst that exhibits high catalytic activity can be obtained accordingly.

Preferably, the support particles have an average particle diameter of 10 nm to 100 nm. This makes it easy for the support particles to form properly the secondary particles each having a porous structure.

Particularly preferably, the support particles each are composed of at least one selected from the group consisting of titanium oxide, aluminum oxide, cerium oxide, zirconium oxide, silica, and carbon, and the support particles have an average particle diameter of 10 nm to 100 nm.

Preferably, the secondary particles formed of the support particles have an average particle diameter of 10 nm to 1000 nm. This makes it easy to form properly the porous membrane having the gaps. More preferably, the secondary particles formed of the support particles have an average particle diameter of 10 nm to 600 nm, particularly preferably 200 nm to 600 nm.

Preferably, the inorganic binder is composed of at least one metal oxide selected from the group consisting of aluminum oxide, titanium oxide, cerium oxide, zirconium oxide, and silica. This makes it possible to form a porous membrane having high adhesivity between the support particles adjacent to each other and between the support particles and the substrate, and having high durability and heat resistance. Also, a noble metal fine particle supported catalyst with high catalytic activity can be obtained.

Preferably, a weight of the inorganic binder in the porous membrane is 70% or less of a weight of the support particles in the porous membrane. This prevents the support particles supporting the noble metal fine particles from being buried in the inorganic binder. Thereby it is possible to obtain a porous membrane having a porous structure that allows many of the noble metal fine particles to be in contact with a reactant. That is, it is possible to obtain a noble metal fine particle supported catalyst with high catalytic activity.

More preferably, the weight of the inorganic binder in the porous membrane is 15% to 50% of the weight of the support particles in the porous membrane. This prevents the support particles supporting the noble metal fine particles from being buried in the inorganic binder. Thereby, it is possible to obtain a porous membrane having a porous structure that allows many of the noble metal fine particles to be in contact with a reactant. That is, it is possible to obtain a noble metal fine particle supported catalyst with high catalytic activity. Furthermore, this makes it possible to form a porous membrane in which the adhesivity is high between the support particles adjacent to each other and between the support particles and the substrate, and that has high durability and heat resistance.

Preferably, the porous membrane has a thickness of 0.1 μm to 10 μm. This makes it possible to obtain a noble metal fine particle supported catalyst in which the separation and damage of the membrane due to the internal stress caused during drying and firing processes can be prevented, and that has high durability and heat resistance.

More preferably, the porous membrane has a thickness of 0.5 μm to 5 μm. This makes it possible to obtain a noble metal fine particle supported catalyst that has higher durability and heat resistance.

The shape of the substrate used in the present embodiment is not particularly limited as long as it allows the support particles to be laminated thereon. Examples of the shape that the substrate can have include platy, tubular, granular, fibrous, and flaky shapes. As the material of the substrate, there can be mentioned a ceramic material, a carbon material, and a metal material, for example. Examples of the ceramic material include aluminum oxide, titanium oxide, cerium oxide, zirconium oxide, and silica. Example of the carbon material include carbon. Examples of the metal material include aluminum, iron, copper, titanium, nickel, and zinc, and an alloy containing these, such as stainless steel and brass.

The noble metal fine particle supported catalyst as described above can be used as a purifying catalyst for purifying exhaust gas or wastewater. Such a purifying catalyst can remove properly the harmful components in exhaust gas and wastewater by the effects of the noble metal fine particle supported catalyst with high catalytic activity.

Hereinafter, one embodiment of the method for producing the noble metal fine particle supported catalyst of the present invention is described. However, the present invention is not limited to this.

The method for producing a noble metal fine particle supported catalyst of the present embodiment includes the steps of bringing a dispersion of noble metal fine particles into contact with support particles having an average particle diameter of 10 nm to 10 nm to allow the noble metal fine particles to be supported on the support particles; mixing the support particles on which the noble metal fine particles are supported with a solvent and stirring a resultant mixture to produce a dispersion of the support particles so that the support particles form secondary particles having an average particle diameter of 10 nm to 1000 nm; producing a coating liquid by mixing the dispersion of the support particles with a metal oxide forming sol forming an inorganic binder; applying the coating liquid to a substrate; and drying and heat-treating the substrate on which the coating liquid is applied. Moreover, in the production method, a porous membrane containing the noble metal fine particles, the support particles, and the inorganic binder is formed on the substrate by binding, with the inorganic binder, the secondary particles formed of the support particles and adjacent to each other, and binding the support particles to the substrate with the inorganic binder.

In the noble metal fine particle supported catalyst of the present embodiment, the support particles on which the noble metal fine particles are supported form the secondary particles in the coating liquid, and the support particles are laminated on the substrate while the support particles maintain the secondary particles. Thereby, the porous membrane is formed. Thus, the noble metal fine particles present within the membrane also act as a catalyst and have high catalytic activity. In order to form such a porous membrane, it is necessary for the secondary particles in the coating liquid to have an average particle diameter equal to or smaller than a predetermined value. Specifically, it is necessary for the secondary particles in the coating liquid to have an average particle diameter of 10 nm to 1000 nm.

(Dispersion of Noble Metal Fine Particles)

Examples of the noble metal for the noble metal fine particles used to prepare the dispersion of the noble metal fine particles include platinum, gold, ruthenium, palladium, and rhodium, and an alloy of these metals and a mixture of these metals. Particularly, platinum is preferable.

The particle diameter of the noble metal fine particles is not particularly limited as long as it does not impair the objects of the present invention. From the viewpoint, of increasing the activity of the supports, as a catalyst, supporting the noble metal fine particles, the particle diameter preferably is 1 nm to 20 nm.

The method for producing the noble metal fine particles used preferably in the present invention may be based on the method described in Nonpatent Literature 1, and the method described in Patent Literature 1 filed by the present applicant. These production methods are preferable because they allow the noble metal fine particles to have a particle diameter of 20 nm or less. However, the method for producing the noble metal fine particles of the present invention is not limited to these.

The following is the method for producing a platinum colloid described in Nonpatent Literature 1.

"2. Method for Producing Platinum Colloid 2.1 Platinum Colloid

A 2 L round bottom flask with a condenser is used for preparing a platinum colloid, 960 ml of distilled water is poured into the flask and boiled sufficiently with a mantle heater. 60 ml of a chloroplatinic acid aqueous solution (1 g-Pt/L) is added thereto. When a resultant solution boils again, 120 ml of a sodium citrate aqueous solution (1 wt %) is added thereto and it was kept boiling. The solution has light yellow color at first due to chloroplatinic acid, but it is blackened gradually and turns to blackish brown in 30 minutes after the sodium citrate was added. When the solution is kept refluxed, it turns to black in 1 hour, and no color change is observed thereafter. To stop the reaction, the reaction solution is immersed in an ice-water bath. A platinum colloid thus obtained is very stable and no aggregation is observed for several months when it is stored in a refrigerator.

Although this preparation method is very easy attention needs to be paid to the following three points in performing the preparation. 1) Wash the vessel carefully and use the vessel after immersing it in aqua regia for one whole day and night in advance. 2) Need to pay attention particularly to water to be used. Distill ion exchange water twice and use it as the water. 3) Always heat the solution during the reaction so as to keep it reacting violently. Paying these attentions makes it possible to prepare a platinum colloid with high reproducibility.

The reason for keeping the solution boiling violently during the reaction is because oxygen in the air hinders the reaction. It is necessary to perform the preparation in the state in which dissolved oxygen is removed from the solution. If the preparation is performed in the state in which the solution is not boiling violently it takes a long time to synthesize the platinum colloid and aggregation occurs, which makes it impossible to obtain highly reproducible results. When inert gas, such as nitrogen gas, is blown into the solution and dissolved oxygen is removed therefrom, the preparation can be performed also at a temperature as low as around 70° C.

It is possible to remove the unreacted chloroplatinic acid and sodium citrate by passing the solution through a column filled with an ion exchange resin Amberlite MB-1. Although the degree of the removal can be checked by measuring the electrical conductivity of the solution. 6 ml of the ion exchange resin is enough for 100 ml of the colloidal solution. Here, the amount of the platinum colloid absorbed by the ion exchange resin is very small."

The method for producing a noble metal colloid described in Patent Literature 1 is as follows. "The reducing agent is not particularly limited as long as it can be dissolved in water. Examples thereof include alcohols, citric acids, carboxylic acids, ketones, ethers, aldehydes, and esters. Two or more of these may be used together. Examples of the alcohols include methanol, ethanol, 1-propanol, 2-propanol, ethylene glycol, and glycerol. Examples of the citric acids include a citrate such as citratic acid, sodium citrate, potassium citrate, and ammonium citrate. Examples of the carboxylic acids include formic acid, acetic acid, fumaric acid, malic acid, succinic acid, and aspartic acid, and carboxylates of these. Examples of the ketones include acetone and methyl ethyl ketone. Examples of the ethers include diethyl ether. Examples of the aldehydes include formalin and acetaldehyde. Examples of the esters include methyl formate, methyl acetate, and ethyl acetate.

From the viewpoint of producing stable metal colloidal particles each having a particle diameter of 1 to 20 nm, alcohols, citric acids, and carboxylic acids are preferable as the reducing agent. Particularly, in order to produce stable metal colloidal particles each having a particle diameter of 1 to 5 nm, citric acids are suitable. However, since the catalytic activity, etc. of the colloidal particles decrease sharply when the particle diameter thereof is less than 1.6 nm, the colloidal particles preferably have an average particle diameter of 1.6 nm or more.

The solvent composing the reaction solution is not particularly limited as long as the reducing agent and a metal salt can be dissolved therein. Examples thereof include water, alcohols, ketones, and ethers. Two or more of these may be used together. Examples of the alcohols include methanol, ethanol, 1-propanol, and 2-propanol. Examples of the ketone include formic acid methyl, methyl acetate, and ethyl acetate. Examples of the ethers include methyl ethyl ether and diethyl ether. From the viewpoint of dissolving the metal salt sufficiently, water and alcohols are preferable as the solvent.

The metal salt is not particularly limited as long as it can be dissolved in the solvent and reduced with the reducing agent. Examples thereof include a chloride, a nitrate, a sulfate, and a metal complex compound of platinum (Pt), ruthenium (Ru), gold (Au), lead (P), rhodium (Rh), iridium (Ir), Cobalt (Co) (Fe), nickel (Ni), copper (Cu), or tin (Sn). Two or more of these may be used together. In the case of using two kinds of metal salts together, it is possible to produce colloidal particles of an alloy. In the case of using a platinum salt as the metal salt, the particle diameter of the colloidal particles becomes particularly small, and stable colloidal particles each having a particle diameter of 1 to 5 nm can be obtained.

The reaction solution containing the metal salt and the reducing agent is boiled, so that the reduction reaction of the metal ions proceeds while the dissolved oxygen is removed. Conceivably, in the early stage of this reaction, the metal ions in the reaction solution are reduced all at once to generate countless metal atoms, and these metal atoms are floating in the reaction solution. This is presumed from the fact that in Example 1 below, a colloidal solution in 30 minutes after the start of the reaction exhibited almost no catalytic activity but had a relatively high platinum concentration (concentration of the remaining metal after metal ions were removed, that is, concentration of colloidal particles). This conceivably indicates the presence of metal atoms and clusters thereof that cannot exhibit catalytic activity because the particle diameter of the metal atoms has not reached 1.6 nm yet, although the metal atoms are not caught by the ion exchange resin because they have been reduced and are not metal ions any more. Conceivably, the metal atoms attract the metal ions and a reduction reaction occurs on surfaces of the metal atoms, or the metal atoms and the clusters are aggregated, so that colloidal particles grow gradually to be larger and come to exhibit catalytic activity. Based on these, it is presumed that the growth of the colloidal particles in the reaction solution is closely related to "the equivalent concentration of the reducing agent with respect to the equivalent, concentration of the metal salt" that is directly involved with the generation of the metal atoms, "the concentration of the metal salt" that is directly involved with the collision frequency among the metal atoms, the clusters thereof, and the metal ions, and "the reaction time" that is directly involved with the reduction reaction and the collision of the metal atoms. Thus, these three parameters are changed and combined suitably so that more favorable production conditions than those in the methods for producing a colloidal solution described in the above-mentioned publications are found out and specified.

A first embodiment thereof is that when the concentration of the metal salt in the reaction solution is $1 \times 10^{-4}$ mol/L or more and less than $4 \times 10^{-4}$ mol/L and the equivalent concentration of the reducing agent is 4 times or more and 20 times or less the equivalent concentration of the metal salt, the reaction time is 60 minutes or more and 300 minutes or less. The first embodiment makes it possible to obtain a metal recovery ratio of 80 to 100%, and allows the metal colloidal particles to have an average particle diameter of 2.3 nm or less.

A second embodiment is that when the concentration of the metal salt in the reaction solution is $4 \times 10^{-4}$ mol/L or more and less than $6 \times 10^{-4}$ mol/L and the equivalent concentration of the reducing agent is 4 times or more and 20 times or less the equivalent concentration of the metal salt, the reaction time is 30 minutes or more and 150 minutes or less. The second embodiment allows the metal colloidal particles to have an average particle diameter of 2 nm or less without sedimenting the metal colloidal particles.

A third embodiment is that when the concentration of the metal salt in the reaction solution is $6 \times 10^{-4}$ mol/L or more and $15 \times 10^{-4}$ mol/L or less and the equivalent concentration of the reducing agent is 4 times or more and 20 times or less the equivalent concentration of the metal salt, the reaction time is 30 minutes or more and 90 minutes or less. The third embodiment allows the metal colloidal particles to have a smaller average particle diameter without sedimenting the metal colloidal particles.

A fourth embodiment is that when the concentration of the metal salt in the reaction solution is $4 \times 10^{-4}$ mol/L or more and less than $6 \times 10^{-4}$ mol/L and the equivalent, concentration of the reducing agent is 2 times or more and less than 4 times the equivalent concentration of the metal salt, the reaction time is 60 minutes or more and 120 minutes or less. The fourth embodiment allows the metal colloidal particles to have an average particle diameter of 2.3 nm or less without sedimenting the metal colloidal particles.

A fifth embodiment is that when the concentration of the metal salt in the reaction solution is $6 \times 10^{-4}$ mol/L or more and $15 \times 10^{-4}$ mol/L or less and the equivalent concentration of the reducing agent is 2 times or more and less than 4 times the equivalent concentration of the metal salt, the reaction time is 30 minutes or more and 240 minutes or less. The fifth embodiment allows the metal colloidal particles to have an average particle diameter of 1.8 nm or less without sedimenting the metal colloidal particles.

A sixth embodiment is that when the concentration of the metal salt in the reaction solution is $4\times10^{-4}$ mol/L or more and less than $6\times10^{-4}$ mol/L and the equivalent concentration of the reducing agent is 1 time or more and less than 2 times the equivalent concentration of the metal salt, the reaction time is 60 minutes or more and 120 minutes or less. The sixth embodiment allows the metal colloidal particles to have an average particle diameter of 2.3 nm or less without sedimenting the metal colloidal particles.

A seventh embodiment is that when the concentration of the metal salt in the reaction solution is $6\times10^{-4}$ mol/L or more and $15\times10^{-4}$ mol/L or less and the equivalent concentration of the reducing agent is 1 time or more and less than 2 times the equivalent concentration of the metal salt, the reaction time is 30 minutes or more and 120 minutes or less. The seventh embodiment allows the metal colloidal particles to have an average particle diameter of 1.8 nm or less without sedimenting the metal colloidal particles.

When the concentration of the metal salt is less than $1\times10^{-4}$ mol/L in the reaction solution, the metal ions are difficult to be reduced, and it takes a long time for the colloidal particles to grow to have a specified particle diameter. Thus, such a reaction solution is unsuitable for industrial use. In contrast, when the concentration of the metal salt exceeds $15\times10^{-4}$ mol/L, the colloidal particles are aggregated easily in the reaction solution and sedimented in the early stage after the start of the reaction. When the equivalent concentration of the reducing agent is less than one time the equivalent concentration of the metal salt in the reaction solution, a part of the metal salt fails to be reduced, and the metal recovery ratio is lowered accordingly. In contrast, when the equivalent concentration of the reducing agent is more than 20 times the equivalent concentration of the metal salt in the reaction solution, the reducing agent is aggregated and sedimented, and thus the metal salt also is incorporated into the sedimentation and the metal recovery ratio is lowered."

A dispersion of noble metal fine particles obtained by reducing a noble metal salt with a citrate does not contain a so-called protective colloid that is composed of an organic substance, etc. and that is added to disperse the colloidal particles. Thus, these noble metal fine particles are not coated with the protective colloid and their surfaces are exposed, thereby exhibiting excellent catalytic effect. Furthermore, the dispersion of noble metal fine particles obtained by the method of Nonpatent Literature 1 is treated with a purifying treatment, and thus the amount of impurities contained therein is extremely small.

A dispersion of noble metal fine particles can be produced by boiling a reaction solution composed of a noble metal salt and a reducing agent.

Examples of the noble metal salt include a chloride of noble metal a nitrate, a sulfate, and a metal complex compound. Two or more of these may be used together.

Examples of the reducing agent include alcohols, citric acids, carboxylic acids, ketones, ethers, aldehydes, and esters. Two or more of these may be used together. Examples of the alcohols include methanol, ethanol, 1-propanol, 2-propanol, ethylene glycol, and glycerol. Examples of the citric acids include citric acid, and a citrate (such as sodium citrate, potassium citrate, and ammonium citrate). Examples of the carboxylic acids include formic acid, acetic acid, fumaric acid, malic acid, succinic acid, aspartic acid, and carboxylates of these. Examples of the ketones include acetone and methyl ethyl ketone. Examples of the ethers include diethyl ether. Examples of the aldehydes include formalin and acetaldehyde. Examples of the esters include methyl formate, methyl acetate, and ethyl acetate. From the reason mentioned above, the citrate can be used suitably as the reducing agent.

Examples of the solvent contained in the reaction solution include water, alcohols, ketones, and ethers.

The concentration of the noble metal salt in the reaction solution is not particularly limited as long as it does not impair the objects of the present invention. Preferably, the concentration is as high as possible. The equivalent concentration of the reducing agent is not particularly limited as long as it does not impair the objects of the present invention. Preferably, it is 2 times or more and 20 times or less the equivalent concentration of the noble metal salt. The boiling (reaction) time is not particularly limited as long as it does not impair the objects of the present invention. Preferably, it is 30 minutes or more and 300 minutes or less.

(Support Particles)

The support particles used in the present embodiment are not particularly limited as long as they can support the noble metal fine particles. In the present embodiment, support particles having an average particle diameter of 10 nm to 100 nm as primary particles are used.

As the type of the material of the support particles, a ceramic material and a carbon material can be mentioned. Examples of the ceramic material include aluminum oxide, titanium oxide, cerium oxide, zirconium oxide, and silica. Examples of the carbon material include carbon. The support particles made of these types of materials are preferable because they can support properly the noble metal colloid (noble metal fine particles) of the present embodiment.

(Production of Support Particles on which Noble Metal Fine Particles are Supported)

First, the dispersion of noble metal fine particles is mixed with the support particles and a resultant mixture is stirred so that the noble metal fine particles are supported on the surfaces of the support particles. Subsequently, the solvent contained in the dispersion is removed. Next, the support particles are dried. Thereby, support particles on which the noble metal fine particles are supported are obtained.

In the present embodiment, the support particles on which the noble metal fine particles are supported are produced using the dispersion of the noble metal fine particles that is prepared independently. Accordingly the particle diameter of the noble metal fine particles supported on the support particles is controlled to an appropriate value (1 nm to 20 nm, for example), and the impurity concentration is extremely low. Therefore, the support particles on which the noble metal fine particles produced in the present embodiment are supported are used preferably. Moreover, by adjusting the amount and composition of the noble metal contained in the dispersion of the noble metal fine particles, it also is possible to control easily the state of the noble metal fine particles being supported on the support particles (the state in which the support particles support the noble metal fine particles). The noble metal fine particles may be produced by another method. Ready-made noble metal fine particles may be used as the noble metal fine particles.

(Metal Oxide Forming Sol)

The metal oxide forming sol used in the present embodiment is not particularly limited as long as it can form a metal oxide (an inorganic binder) when sintered. Preferably, the metal oxide to be formed is at least one selected from titanium oxide, aluminum oxide, cerium oxide, zirconium oxide, and silica. For example, the titanium oxide forming sol preferably is at least one selected from organic titanates and a titanium halide. The organic titanates preferably are at least one selected from titanium alkoxide, titanium acylate, titanium chelate, and a titanium polymer.

(Substrate)

The shape of the substrate used in the present embodiment is not particularly limited as long as the support particles can be laminated thereon. It can be platy, tubular, granular, fibrous, flaky, or the like. As the material of the substrate, a ceramic material, a carbon material, and a metal material can be mentioned. Examples of the ceramic material include aluminum oxide, titanium oxide, cerium oxide, zirconium oxide, and silica. Examples of the carbon material include carbon. Examples of the metal material include aluminum, iron, copper, titanium, nickel, and zinc, and alloys containing these, such as stainless steel and brass. Among these materials, it is preferable to select from the same materials as those of the metal oxide (inorganic, binder) formed from the metal oxide forming sol, taking into consideration the adhesion (that is, the adhesivity between the support particles and the substrate), durability and heat resistance of the porous membrane of the present embodiment. That is, the substrate preferably is composed of at least one metal oxide selected from the group consisting of aluminum oxide, titanium oxide, cerium oxide, zirconium oxide, and silica.

(Production of Noble Metal Fine Particle Supported Catalyst)

In the present embodiment, the noble metal fine particle supported catalyst is produced by mixing the dispersion of the support particles on which the noble metal fine particles are supported with the metal oxide forming sol, applying the resultant coating liquid to the substrate to form a membrane, and then sintering the membrane. As the method far forming the membrane, there can be used a known method such as a dip coating method, a spin coating method, a spray method, an application method.

In the present embodiment, the dispersion of the support particles on which the noble metal fine particles are supported is prepared by mixing the support particles on which the noble metal fine particles are supported with the organic solvent and stirring the mixture, as described above. Here, it is preferable to treat the dispersion of the support particles with a crushing treatment and a dispersing treatment to enhance the dispersibility of the support particles.

At the time when the coating liquid is applied to the substrate and laminated thereon, the second particles formed of the support particles on which the noble metal fine particles are supported need to have, in the organic solvent, an average particle diameter of 10 nm to 1000 nm, preferably 10 nm to 600 nm, and more preferably 200 nm to 600 nm, in order to form a coating having a porous structure on the substrate. When the particle diameter of the secondary particles exceeds 1000 nm, there is a possibility that no porous state is formed at the time of lamination, and also it becomes difficult, to form a uniform membrane, and moreover the membrane is separated and no catalytic property is obtained.

In the present embodiment, the dispersion of the support particles may be treated with a crushing treatment and a dispersing treatment at a time that is after the support particles on which the noble metal fine particles are supported are mixed with the solvent, and before the dispersion of the support particles is mixed with the metal oxide forming sol, in order to adjust the average particle diameter of the secondary particles to 10 nm to 1000 nm. By the crushing treatment and the dispersing treatment, it is possible to adjust the average particle diameter of the second particles formed of the support particles and enhance the dispersibility of the support particles. The crushing treatment refers to a treatment in which the support particles collected as solids are crushed in the solvent so that the secondary particles formed of the support particles are made fine. The dispersing treatment refers to a treatment in which the secondary particles formed of the support particles are made finer (through the dispersing treatment, the particle diameter can be about several tens of nanometers, for example). The crushing treatment and the dispersing treatment may include stirring or an ultrasonic treatment.

The type of the organic solvent is not particularly limited as long as the support particles can be dispersed therein. Examples of the organic solvent include alcohols, ketones, ethers, and a mixed solvent of these. Pure water also can be used instead, of the organic solvent.

Preferably, the metal oxide forming sol is added so that a weight of the metal oxide (inorganic binder) formed from the metal oxide forming sol contained in the coating liquid is 70% or less, more preferably 15% to 50% of a weight of the support particles contained in the coating liquid. When the amount of the metal oxide forming sol is too small, it is impossible, in some cases, to obtain sufficient adhesion between the support particles on which the noble metal fine particles are supported and between the support particles (noble metal fine particle supported support particles) on which the noble metal fine particles are supported and the substrate, and the durability of the porous membrane is lowered. When the amount of the metal oxide forming sol is too large, the noble metal fine particle supported support particles are buried in the metal oxide and the area of the catalyst effective for the reaction is reduced in some cases. The metal oxide formed from the metal oxide forming sol contained in the coating liquid refers to a metal oxide that can be formed theoretically from the metal oxide forming sol contained in the coating liquid.

In the noble metal fine particle supported catalyst produced as described above, the support particles on which the noble metal fine particles are supported are laminated on the substrate in the state in which the support particles form the secondary particles. Thus, gaps are generated among the secondary particles due to steric hindrance, and as a result, a porous membrane is formed on the substrate. Thereby, the noble metal fine particles present within the membrane can also act as a catalyst. Moreover, since the membrane is formed using the noble metal fine particle supported support particles, the amount of the noble metal fine particles is unlikely to vary between within the membrane and on the surface of the membrane. That is, the noble metal fine particles are dispersed uniformly in the noble metal fine particle supported catalyst produced in the present embodiment.

Preferably, the formed porous membrane has a thickness of 0.1 μm to 10 μm, more preferably 0.5 μm to 5 μm. When the thickness of the porous membrane is less than 0.1 μm, a sufficient amount of the noble metal fine particles may not be supported. When the thickness exceeds 10 μm, the porous membrane is highly likely to be separated and damaged due to internal stress.

The present embodiment is summarized hereinafter. In the present embodiment, firstly, known noble metal fine particles (such as the noble metal colloid described in JP 2004-100040 A (Patent Literature 1) filed by the present applicant) that are finely made and have a small variation in particle diameter are mixed with support particles composed of titanium oxide, etc. to produce support particles on which the noble metal fine particles are supported. Subsequently, a dispersion obtained by dispersing the support particles in a solvent is mixed with an inorganic binder component such as a metal oxide forming sol to obtain a coating liquid. Subsequently, this coating liquid is applied (deposited) on a substrate, and the substrate is dried and sintered as needed. In this manner, in the present embodiment, the support particles on which the noble metal fine particles are supported are bound to each other to produce a membrane (porous membrane) having a porous laminated structure.

In the present embodiment, there are used the noble metal fine particles that are obtained by preparing independently the dispersion of the noble metal fine particles, and that are finely made and have narrow particle size distribution. Moreover, the noble metal colloid described in Patent Literature 1 contains substantially no protective colloid, and furthermore impurities are removed through a purification treatment in the final process of producing a noble metal colloid solution. In the present embodiment, it also is possible to use noble metal fine particles produced by the same method as that used to produce the noble metal colloid of Patent Literature 1. This makes it possible to obtain a noble metal fine particle supported catalyst in which noble metal fine particles have very high purity and that has high catalytic activity.

Furthermore, in the present embodiment, in the process of mixing the dispersion of the noble metal fine particles prepared independently with the support particles, the mixing ratio thereof can be adjusted suitably. Thereby, it is possible to control easily the amount of the noble metal fine particles supported on the support particles. Furthermore, in the present embodiment, a dispersion obtained by mixing together a plural kinds of dispersions of noble metal fine particles can be mixed with the support particles. Thereby, it also is possible to prepare support particles on which a plural kinds of noble metal fine particles are supported, and to produce a high-performance noble metal fine particle supported catalyst.

Moreover, in the present embodiment, it also is possible to perform the crushing treatment and the dispersing treatment after the support particles on which the noble metal fine particles are supported are added to the solvent. For example, by stirring and performing a treatment such as an ultrasonic treatment, it is possible to control the particle diameter of the secondary particles formed of the support particles. At the time when the porous membrane is formed on the substrate, the average particle diameter of the secondary particles formed of the support particles is an important factor that determines the fine structure of the porous membrane. When the aggregation of the support particles cannot be dissociated and many of the secondary particles have a large particle diameter, the porous membrane is not formed properly and also it is difficult to form the membrane uniformly. This raises a possibility that the porous membrane is separated and no proper catalytic property can be obtained. However, the present embodiment is free from such a possibility because an appropriate dispersing treatment and crushing treatment can be performed as needed.

Furthermore, in the present embodiment, the metal oxide forming sol is added to the dispersion of the noble metal fine particles, and the resultant coating liquid is applied to the substrate to form the membrane. By adding the metal oxide forming sol to the dispersion of the noble metal fine particles, it is possible to enhance the adhesion between the support particles on which the noble metal fine particles are supported and between the support particles and the substrate. Since the support particles on which the noble metal fine particles are supported are laminated on the substrate in the form of the secondary particles, gaps are generated among the secondary particles due to steric hindrance to form a porous structure. Thereby the noble metal fine particles present within the membrane also can act as a catalyst. Since the membrane is formed using the support particles on which the noble metal fine particles are supported, variation is unlikely to occur between the amount of the noble metal fine particles within the membrane and the amount of the noble metal fine particles on the surface of the membrane.

EXAMPLES

Example 1

Titania particles (P25, φ 20 nm, produced by Nippon Aerosil Co., Ltd.) were used as the support particles, and Pt fine particles were supported on the surfaces thereof. Resultant Pt supported titania particles were mixed with a titania forming sol to produce a coating liquid. Using this coating liquid, a porous membrane was formed on a substrate. The specific production method was as follows.

(1) First, pure water that had been ion-exchanged and ultrafiltrated was boiled and refluxed to obtain pure water from which dissolved oxygen had been removed. Next, the pure water from which dissolved oxygen had been removed was added to hydrogen hexachloroplatinate hexahydrate to prepare a hydrogen hexachloroplatinate aqueous solution. Also, sodium citrate was added to the above-mentioned pure water from which the dissolved oxygen had been removed to prepare a sodium citrate aqueous solution. This sodium citrate served as a reducing agent.

Subsequently, the hydrogen hexachloroplatinate aqueous solution was added to pure water from which dissolved oxygen had been removed by boiling and refluxing to produce an aqueous solution. Next, this aqueous solution was boiled and refluxed for 30 minutes, and the sodium citrate aqueous solution was added thereto to obtain a reaction solution. The reaction solution continued to be boiled and refluxed even after the sodium citrate aqueous solution was added so as to allow the reduction reaction of Pt to proceed in the reaction solution. The reaction was stopped in 1.5 hours after the start of the reduction reaction (that is, after the sodium citrate aqueous solution was added), and the reaction solution was cooled rapidly to room temperature.

Subsequently, the cooled reaction solution was passed through a column filled with an ion exchange resin (MB-1, produced by Organo Corp.) to remove the metal ions and the reducing agent remaining in the reaction solution, and thereby a stable dispersion of Pt fine particles was obtained. The Pt fine particles in the obtained dispersion had a particle diameter of 1 nm to 5.5 nm. This is a value measured through observation, by a transmission electron microscope (TEM), on the state of the Pt particles being supported on the titania particles in the following process (2). FIG. 1 shows one example of the observation result. FIG. 1 is from the observation on the state of the Pt fine particles being supported on the titania particles. In FIG. 1, the Pt fine particles are seen in black.

(2) Subsequently, the dispersion of the Pt fine particles obtained in (1) was mixed with titania particles so that the Pt fine particles were supported on the titania particles. Thereby, a solution containing Pt supported titania particles was obtained. Subsequently, the Pt supported titania particles were taken out from this solution and dried at 100° C. for 12 hours. Subsequently, 30 g of the dried Pt supported titania particles was added to 1 L of isopropyl alcohol (IPA), and then a resultant mixture was stirred and treated with the crushing treatment and the dispersing treatment. Thus, a dispersion of the Pt supported titania particles was prepared. In the present example, mixed crushing by a homogenizer was performed as the crushing treatment. As the dispersing treatment, mixed dispersing by a mill was performed. By using an apparatus for evaluating particle size distribution (FPAR-1000, manufactured by Otsuka Electronics Co., Ltd.), it was found that second particles, in the IPA, formed of the Pt supported titania particles had an average particle diameter of 100 nm.

(3) Next, 15 g of titanium chelate (Tita Bond T-50, produced by Nippon Soda Co., Ltd.) was mixed with 5 g of an organic solvent (Solmix AP-7, produced by Japan Alcohol Trading Co., Ltd.) and a resultant mixture was stirred to prepare a titania forming sol. Subsequently, 27 ml of the dispersion of the Pt supported titania particles was mixed with 3 ml of the titania forming sol obtained in (2) and a resultant mixture was stirred to prepare a coating liquid. The ratio of a metal oxide formed from the titania formation sol contained in the coating liquid was 25 wt % with respect to the Pt supported titania particles contained in the coating liquid.

(4) Subsequently, a glass substrate (a slide glass produced by Matsunami Glass Ind., Ltd.) was immersed in the coating liquid obtained in (3). That is, dip coating was performed. In the present example, the dip coating was performed 4 times. Thereby, a membrane was formed on the glass substrate.

Figure 2:
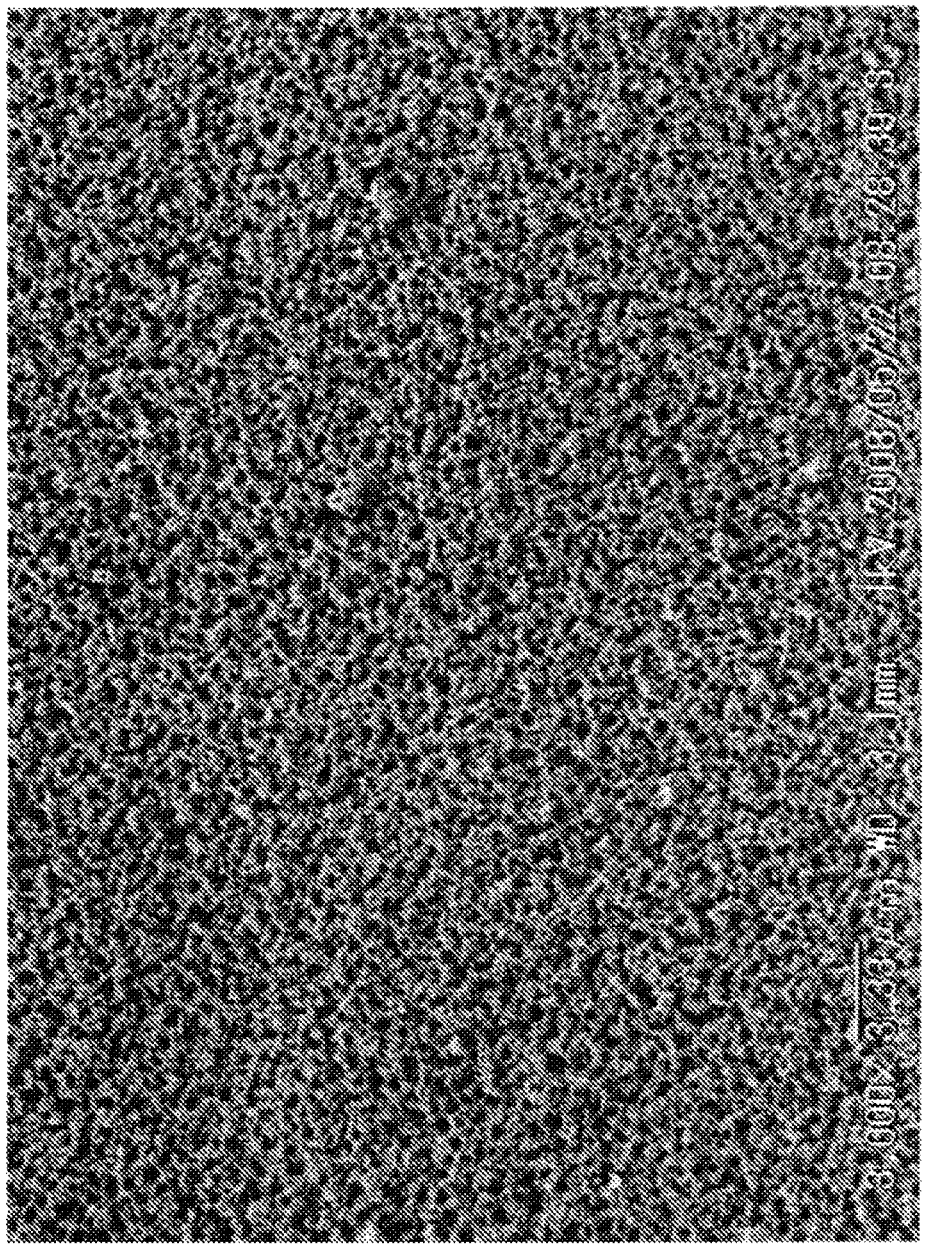
FIG. 2 is an example of an SEM observation image of a surface of an obtained membrane.
Figure 3:
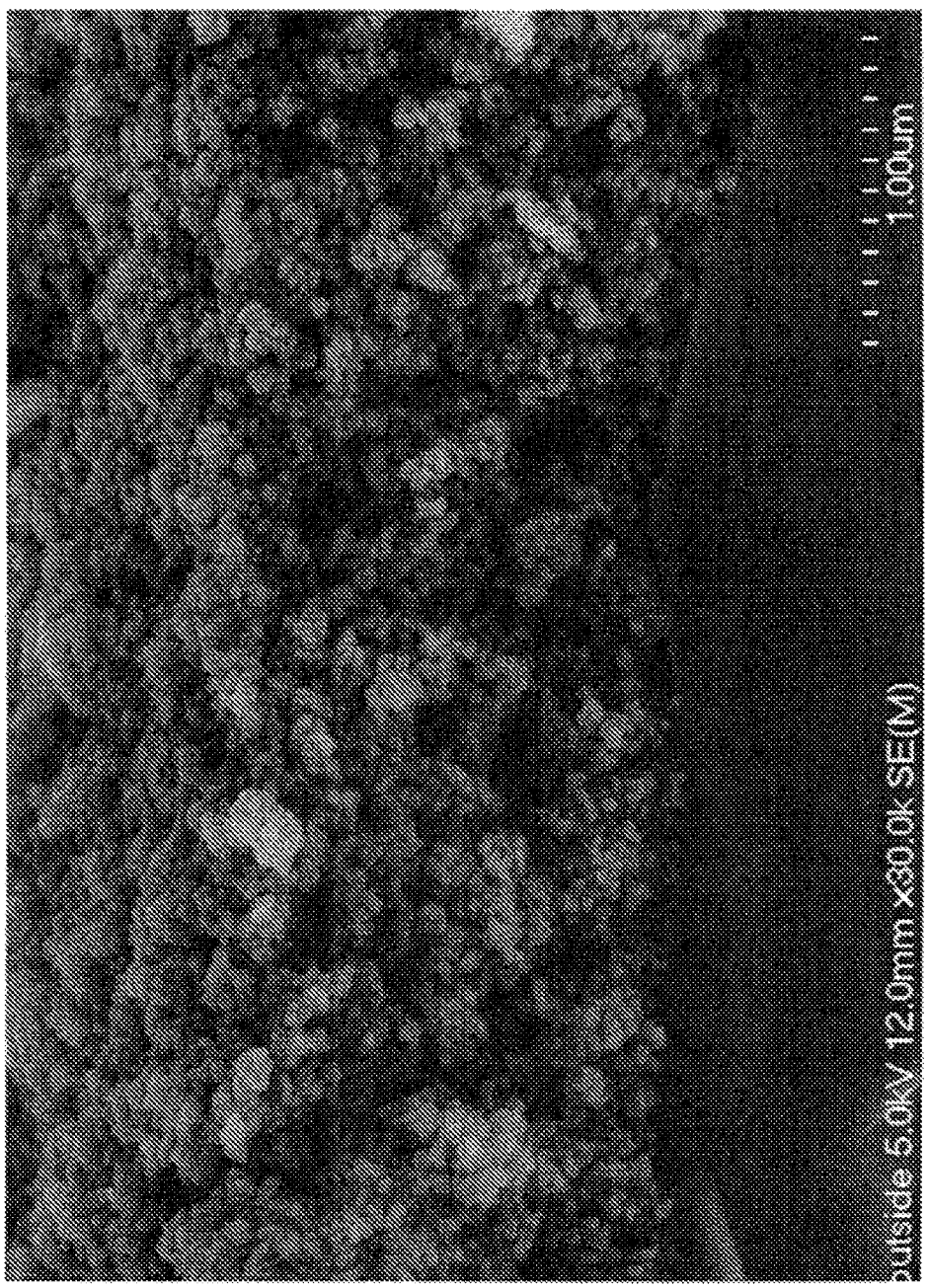
FIG. 3 is an example of an SEM observation image of a cross section of the obtained membrane.

(5) Next, the membrane formed on the glass substrate in (4) was sintered at 400° C. for 1 hour. Thereby, a noble metal fine particle supported catalyst was obtained. An SEM observation found that the obtained membrane had a thickness of about 1 µm. Likewise, an SEM observation was made also to see the surface state. FIG. 2 and FIG. 3 each show an example of the observation result. FIG. 2 is an image of the surface of the membrane. FIG. 3 is an image of a cross-section of the membrane. FIG. 2 and FIG. 3 indicate that the membrane is porous.

Example 2

The noble metal fine particle supported catalyst of Example 2 was produced by the same method as that in Example 1, except that the thickness of the membrane was increased.

(1) Using the coating liquid obtained in (3) of Example 1, the dip coating was performed 8 times on the glass substrate. Thereby, a membrane was formed on the glass substrate.

(2) Subsequently, the membrane formed on the glass substrate in (1) was sintered in the same manner as in (5) of Example 1. Thereby, a noble metal fine particle supported catalyst was obtained. An SEM observation found that the obtained membrane had a thickness of about 2 µm. It also found that the membrane was porous.

Example 3

The noble metal fine particle supported catalyst of Example 3 was produced by the same method as that in Example 1, except that the average particle diameter of the second particles formed of the Pt supported titania particles was increased.

(1) The time spent for the crushing treatment on the Pt supported titania particles in (2) of Example 1 was reduced to one fifth to prepare a dispersion of the Pt supported titania particles at a lower dispersed degree. As a result, the second particles formed of the Pt supported titania particles had an average particle diameter of 800 nm in the IPA.

(2) Subsequently, using the dispersion of the Pt supported titania particles obtained in (1), a coating liquid was prepared in the same manner as in (3) of Example 1.

(3) Next, using the coating liquid obtained in (2), a membrane was formed in the same manner as in (4) of Example 1, and sintering was performed in the same manner as in (5) of Example 1. Thereby, a noble metal fine particle supported catalyst was obtained. An SEM observation found that the obtained membrane had a thickness of about 1 µm. It also found that the membrane was porous.

Example 4

The noble metal fine particle supported catalyst of Example 4 was produced by the same method as that in Example 3, except that the thickness of the membrane was increased.

(1) The dip coating in (3) of Example 3 was performed 8 times and a membrane was formed on a glass substrate. Subsequently, the membrane formed on the glass substrate was sintered in the same manner as in (5) of Example 1. Thereby, a noble metal fine particle supported catalyst was obtained. An SEM observation found that the obtained membrane had a thickness of about 2 µm. It also found that the membrane was porous.

Comparative Example 1

The noble metal fine particle supported catalyst of Comparative Example 1 was produced by the same method as that in Example 1, except that the average particle diameter of the second particles formed of the Pt supported titania particles was larger than that of the second particles formed of the Pt supported titania particles in Example 3.

(1) The crushing treatment on the Pt supported titania particles in (2) of Example 1 was omitted to prepare a dispersion of the Pt supported titania particles at a lower dispersed degree. As a result, the second particles formed of the Pt supported titania particles had an average particle diameter of 1600 nm in the IPA.

(2) Subsequently, using the dispersion of the Pt supported titania particles obtained in (1), a coating liquid was prepared in the same manner as in (3) of Example 1.

Figure 4:
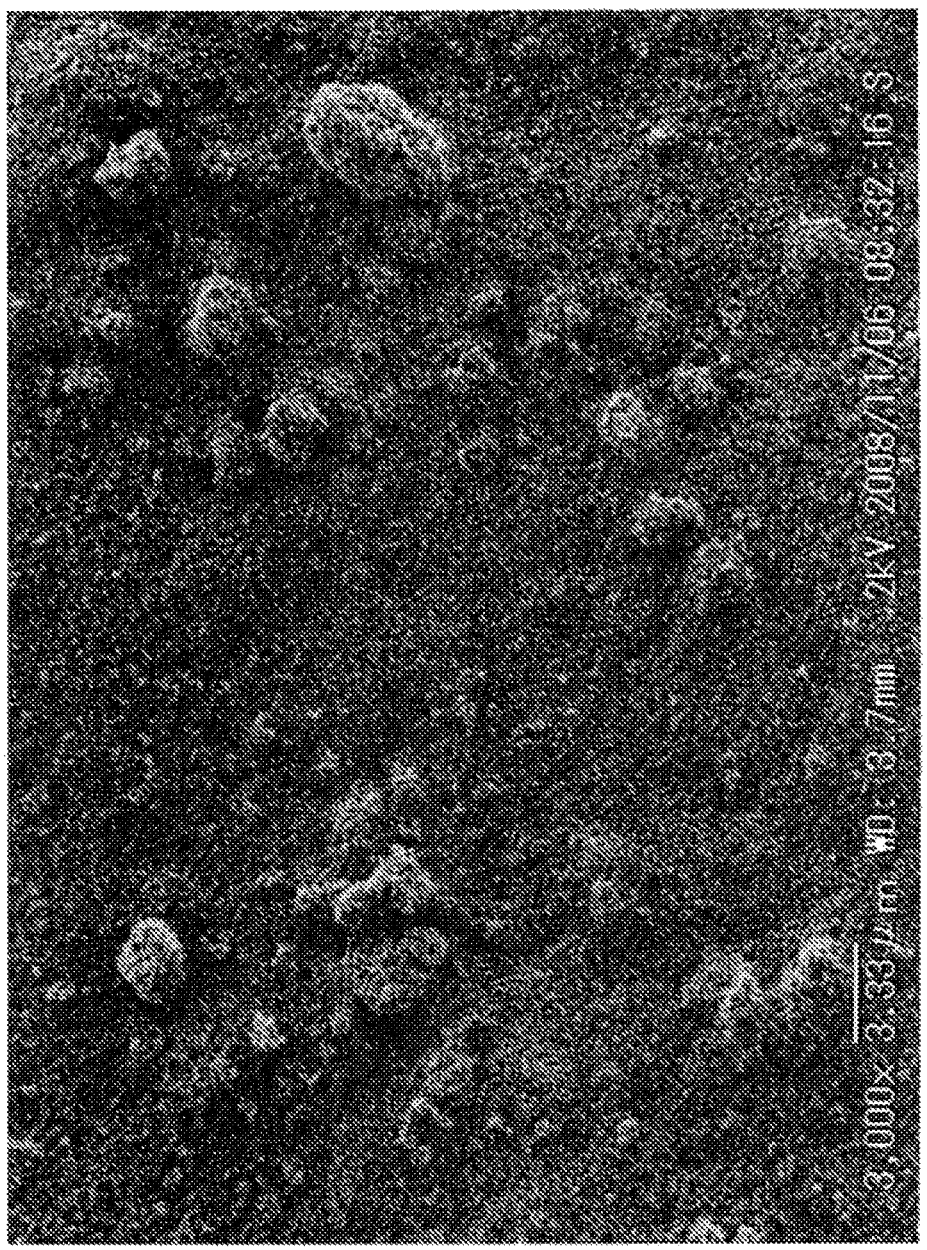
FIG. 4 is an example of an SEM observation image of a surface of an obtained membrane.

(3) Next, using the coating liquid obtained in (2), a membrane was formed in the same manner as in (4) of Example 1, and sintering was performed in the same manner as in (5) of Example 1. Thereby, a noble metal fine particle supported catalyst was obtained. An SEM observation found that the obtained membrane had a thickness of about 1 µm. FIG. 4 shows the result of the SEM observation on the membrane surface. It reveals that the membrane was porous.

Comparative Example 2

The noble metal fine particle supported catalyst of Comparative Example 2 was produced by the same method as that in Example 1, except that the thickness of the membrane was increased.

(1) Using the coating liquid obtained in (2) of Comparative Example 1, the dip coating was performed 8 times on the glass substrate to form a membrane on the glass substrate. Subsequently, the membrane formed on the glass substrate was sintered in the same manner as in (5) of Example 1. Thereby, a noble metal fine particle supported catalyst was obtained. An SEM observation found that the obtained membrane had a thickness of about 2 µm. It also found that the membrane was porous.

The noble metal fine particle supported catalysts of Examples 1 to 4 and Comparative Examples 1 to 2 were evaluated for catalytic activity by checking their characteristics in decomposing hydrogen peroxide. 10 ml of a 10% hydrogen peroxide solution was poured into a petri dish and each catalyst was immersed therein. The concentration of residual hydrogen peroxide after a predetermined time was evaluated with a peroxide test paper (produced by MACH-EREY-NAGEL GmbH & Co. KG). Specifically, a graph of the elapsed reaction time (hour) and the concentration of hydrogen peroxide (wt p.p.m.) was made, and the amount of change in the concentration of hydrogen peroxide per unit time in the early stage of the reaction was calculated from the gradient of an approximation straight line of the graph. The resultant value was defined as decomposition rate. Table 1 shows the evaluation results.

TABLE 1

| Sample | Decomposition rate (p.p.m./hour) |
|---|---|
| Example 1 | 0.168 |
| Example 2 | 0.321 |
| Example 3 | 0.237 |
| Example 4 | 0.484 |
| Comparative Example 1 | 0.099 |
| Comparative Example 2 | 0.116 |

Despite of the fact that the membrane of the catalyst in Comparative Example 2 had a thickness two times larger than that of the membrane of the catalyst in Comparative Example 1, the decomposition rate of the catalyst in Comparative Example 2 was almost equal to that of the catalyst in Comparative Example 1. That is, the decomposition rate (catalytic property) was not proportional to the thickness. In contrast, the membrane of the catalyst in Example 2 had a thickness two times larger than that of the membrane of the catalyst in Example 1, and the decomposition rate of the catalyst in Example 2 was two times higher than that of the catalyst in Example 1. That is, the decomposition rate (catalytic property) was proportional to the thickness. This relation also held between Example 3 and Example 4. From the above, it is conceived that the Pt fine particles present within the membrane also contributed to the catalytic reaction in Examples 1 to 4. That is, it is conceived that since the membrane of the catalyst in each of Examples 1 to 4 had a porous structure (had a gap between the secondary particles formed of the support particles and adjacent to each other), hydrogen peroxide penetrated into the membrane, and not only the Pt fine particles on the surface of the membrane but also the Pt fine particles within the membrane acted effectively to decompose the hydrogen peroxide. Presumably, in Comparative Examples 1 and 2, only the Pt fine particles present on the surface of the membrane acted to decompose the hydrogen peroxide because the membranes in Comparative Examples 1 and 2 were not porous.

Comparative Example 3

Comparative Example 3 was an example in which titania particles (ST-41, φ 200 nm, produced by Ishihara Sangyo Kaisha, Ltd.) having a large particle diameter as primary particles were used as the support particles. The basic production conditions were the same as those in Example 1.

(1) First, the dispersion of the Pt fine particles obtained in (1) of Example 1 was mixed with titania particles so that the Pt fine particles were supported on the titania particles. Thereby a solution containing Pt supported titania particles was obtained. Subsequently, the Pt supported titania particles were taken out from this solution and dried at 100° C. for 12 hours. Next, 30 g of the dried Pt supported titania particles was added to 1 L of isopropyl alcohol (IPA) and a resultant mixture was treated with the crushing treatment and the dispersing treatment to prepare a dispersion of the Pt supported titania particles. By using an apparatus for evaluating particle size distribution, it was found that second particles, in the IPA, formed of the Pt supported titania particles had an average particle diameter of 600 nm.

(2) Subsequently, using the dispersion of the Pt supported titania particles obtained in (1), a membranes was formed through the same processes as those in (3) and (4) of Example 1, and sintering was performed in the same manner as in (5) of Example 1. Thereby, a noble metal fine particle supported catalyst was obtained.

In the catalyst obtained in Comparative Example 3, the membrane had poor uniformity and an unformed portion thereof was found on the substrate. Moreover, in the portion formed as the membrane, the formation of the porous structure was insufficient compared to the catalyst in Example 1. Therefore, the obtained membrane was not a porous membrane with a structure as specified in the present invention.

Examples 5 to 8

Examples 5 to 8 are examples each obtained by changing the ratio of the titania forming sol contained in the coating liquid with respect to the support particles (that is the ratio of the metal oxide formed from the titania formation sol with respect to the support particles) in Example 1.

(1) Coating liquids were prepared by changing the amount of the dispersion of the Pt supported titania particles and the amount of the titania forming sol in (3) of Example 1. Table 2 shows the preparation condition (the weight percent of the metal oxide with respect to the support particles) for each of Examples 5 to 8.

(2) Subsequently, using each coating liquid obtained in (1), the dip coating was performed twice under the same conditions as those in (4) of Example 1, and sintering was performed in the same manner as in (5) of Example 1. Thereby, noble metal fine particle supported catalysts of Examples 5 to 8 were obtained.

Comparative Examples 4 to 6

Comparative Examples 4 to 6 were examples obtained by changing the ratio of the metal oxide with respect to the support particles in the coating liquid in Example 1. In Comparative Example 6, no metal oxide (titania forming sol) was added.

(1) Coating liquids were prepared by changing the amount of the dispersion of the Pt supported titania particles and the amount of the titania forming sol in (3) of Example 1. Table 2 shows the preparation condition (the weight percent of the metal oxide with respect to the support particles) for each of Examples 4 to 6.

(2) Subsequently, using each coating liquid obtained in (1), the dip coating was performed twice under the same conditions as those in (4) of Example 1, and sintering was performed in the same manner as in (5) of Example 1. Thereby, noble metal fine particle supported catalysts of Comparative Examples 4 to 6 were obtained.

TABLE 2

| Sample | Weight percent of metal oxide with respect to support particles |
|---|---|
| Example 5 | 70 |
| Example 6 | 50 |
| Example 7 | 15 |
| Example 8 | 5 |

TABLE 2-continued

| Sample | Weight percent of metal oxide with respect to support particles |
|---|---|
| Comparative Example 4 | 90 |
| Comparative Example 5 | 80 |
| Comparative Example 6 | 0 |

Examples 5 to 8 and Comparative Examples 4 to 6 were evaluated for storage stability of the coating liquid, adhesion of the membrane, and catalytic activity. The storage stability of the coating liquid was evaluated by checking visually the state of the support particles being dispersed after the prepared coating liquid was sealed in a glass container and left for one day. Specifically, the state of the support particles being dispersed was checked by the presence/absence of sedimentation of the support particles. It was determined as good when no sedimentation was observed. When concentration distribution of the support particles occurred in the depth direction of the coating liquid, such as when even a small amount of the support particles was sedimented or a supernatant was generated, it was regarded as the presence of sedimentation and determined as poor. The adhesion of the membrane was evaluated by conducting a tape separation test on the sintered membrane of the catalyst. The adhesion of the membrane was evaluated in three grades. Specifically, it was determined as excellent, when the separated area was 10% or less of the tested surface. It was determined as good when the separated area was 10 to 30% of the tested surface. It was determined as poor when the separated area was 30% or more of the tested surface. The catalytic activity was evaluated by the characteristics of the catalyst in decomposing hydrogen peroxide mentioned above. Specifically, it was determined as excellent when the decomposition rate was equal to or higher than the decomposition rate in Example 1 or when the decomposition rate was lowered 10% or less from the decomposition rate in Example 1. It was determined as good when the decomposition rate was lowered 10% to 30% from the decomposition rate of Example 1. It was determined as poor when the decomposition rate was lowered 30% or more from the decomposition rate in Example 1. FIG. 3 shows the evaluation results.

TABLE 3

| | Weight percent of metal oxide with respect to support particles | Evaluation results | | |
|---|---|---|---|---|
| Sample | | Storage stability | Adhesion | Catalytic activity |
| Example 5 | 70 | good | excellent | good |
| Example 6 | 50 | good | excellent | excellent |
| Example 7 | 15 | good | excellent | excellent |
| Example 8 | 5 | good | good | excellent |
| Comparative Example 4 | 90 | poor | excellent | poor |
| Comparative Example 5 | 80 | poor | excellent | poor |
| Comparative Example 6 | 0 | good | poor | excellent |

It was found that the storage stability of the coating liquid decreased when the content of the metal oxide was higher. Sedimentation of the Pt supported titania particles was observed in the coating liquids of Comparative Examples 4 and 5 in which the content of the metal oxide was high. Presumably, this is because the addition of the titania forming sol deteriorated the state of the Pt supported titania particles being dispersed. That is, it is advantageous to set appropriately, as needed, the upper limit, of the content of the metal oxide in the coating liquid, from the viewpoint of production method.

It was found that the membrane had a higher adhesion in a sample in which the content of the metal oxide was higher. This is because the metal oxide acted as a binding material between the Pt supported titania particles, and between the Pt supported titania particles and the substrate. In Comparative Example 6 in which no metal oxide was contained, the membrane was separated almost entirely. That is, it is possible to provide a highly-durable noble metal fine particle supported catalyst by setting appropriately the lower limit of the content of the metal oxide forming sol in the coating liquid (that is, by setting appropriately the lower limit of the content of the metal oxide (inorganic binder) in the membrane), as needed.

Figure 5:
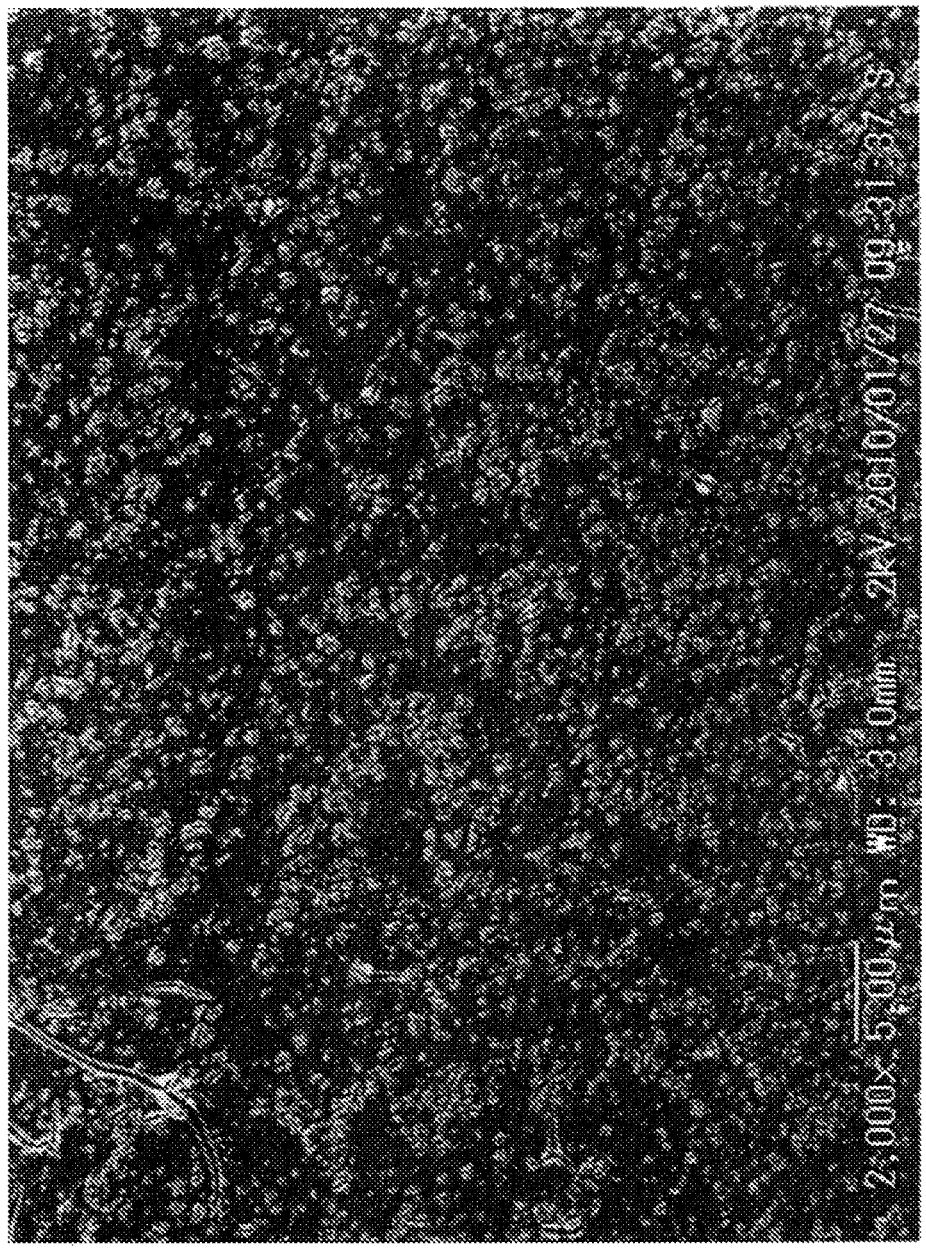
FIG. 5 is an example of an SEM observation image of a surface of an obtained membrane.

A sample in which the content of the metal oxide was higher tended to have a lower catalytic activity. Presumably this is because in the sample in which the content of the metal oxide was higher, the Pt supported titania particles were buried in the metal oxide membrane, and there was no gap between the secondary particles formed of the support particles and adjacent to each other (that is, a porous membrane could not be formed), reducing the amount of Pt that acted as a catalyst. FIG. 5 is an SEM observation image of a surface of the membrane of Comparative Example 5. FIG. 5 also supports this presumption. That is, it is possible to provide a noble metal fine particle supported catalyst with high catalytic activity by setting appropriately the upper limit of the content of the metal oxide forming sol in the coating liquid (that is, by setting appropriately the upper limit of the content of the metal oxide (inorganic hinder) in the membrane), as needed.

The results shown in Table 3 reveal that the ratio of the metal oxide (inorganic binder) formed from the metal oxide forming sol contained in the coating liquid with respect to the support particles contained in the coating liquid preferably is 70 wt % or less, particularly preferably 15 wt % to 50 wt %.

INDUSTRIAL APPLICABILITY

The present invention can provide a noble metal fine particle supported catalyst having a porous structure and a large reaction area. That is, the present invention can provide a noble metal fine particle supported catalyst with high catalytic activity.

The invention claimed is:

1. A noble metal fine particle supported catalyst comprising a substrate; and a porous membrane formed on the substrate,
    wherein the porous membrane comprises support particles, noble metal fine particles, and an inorganic binder,
    in the porous membrane, the noble metal fine particles are supported on surfaces of the support particles, and a plurality of the support particles on which the noble metal fine particles are supported form a secondary particle having a porous structure, and
    the porous membrane is formed by binding, with the inorganic binder, a plurality of the secondary particles formed of the support particles on which the noble metal fine particles are supported so that a gap is present at least partly between the secondary particles adjacent to each other.

2. The noble metal fine particle supported catalyst according to claim 1, wherein the noble metal fine particles each are composed of at least one material selected from the group consisting of Pt, Pd, Au, Ru, and Rh, and have a particle diameter from 1 nm to 20 nm.

3. The noble metal fine particle supported catalyst according to claim 1, wherein the noble metal fine particles each have a particle diameter from 1 nm to 5.5 nm.

4. The noble metal fine particle supported catalyst according to claim 1, wherein the noble metal fine particles each comprise Pt and have a particle diameter from 1 nm to 5.5 nm.

5. The noble metal fine particle supported catalyst according to claim 1, wherein the noble metal fine particles each comprise Pd and have a particle diameter from 5 nm to 15 nm.

6. The noble metal fine particle supported catalyst according to claim 1, wherein the support particles each comprise at least one material selected from the group consisting of titanium oxide, aluminum oxide, cerium oxide, zirconium oxide, silica, and carbon, and the support particles have an average particle diameter from 10 nm to 100 nm.

7. The noble metal fine particle supported catalyst according to claim 1, wherein the inorganic binder comprises at least one metal oxide selected from the group consisting of aluminum oxide, titanium oxide, cerium oxide, zirconium oxide, and silica.

8. The noble metal fine particle supported catalyst according to claim 1, wherein a weight of the inorganic binder in the porous membrane is 70% or less relative to a weight of the support particles in the porous membrane.

9. The noble metal fine particle supported catalyst according to claim 1, wherein a weight of the inorganic binder in the porous membrane is from 15% to 50% relative to a weight of the support particles in the porous membrane.

10. The noble metal fine particle supported catalyst according to claim 1, wherein the porous membrane has a thickness from 0.1 μm to 10 μm.

11. The noble metal fine particle supported catalyst according to claim 1, wherein the porous membrane has a thickness from 0.5 μm to 5 μm.

12. A purifying catalyst for purifying exhaust gas or wastewater, comprising the noble metal fine particle supported catalyst according to claim 1.

13. The noble metal fine particle supported catalyst according to claim 1,
wherein the secondary particle is an aggregate of the plurality of the support particles on which the noble metal fine particles are supported, and
the secondary particle has fine pores each formed of a gap between the support particles forming the aggregate.

14. A method for producing a noble metal fine particle supported catalyst, comprising steps of:
bringing a dispersion of noble metal fine particles into contact with support particles having an average particle diameter from 10 nm to 100 nm so that the noble metal fine particles are supported on the support particles;
mixing the support particles on which the noble metal fine particles are supported with a solvent so as to form a mixture, and stirring the resultant mixture so as to produce a dispersion of the support particles so that a plurality of the support particles on which the noble metal fine particles are supported form a secondary particle having an average particle diameter from 10 nm to 1000 nm;
producing a coating liquid by mixing the dispersion of the support particles with a metal oxide forming sol that forms an inorganic binder;
applying the coating liquid to a substrate; and
drying and heat-treating the substrate on which the coating liquid is applied,
wherein a porous membrane comprises the noble metal fine particle; the support particles; and the inorganic binder,
the porous membrane is formed on the substrate by binding, with the inorganic binder, the secondary particles that are formed of the support particles on which the noble metal fine particles are supported and are adjacent to each other, and binding the support particles to the substrate with the inorganic binder, so that a gap is present at least partly between the secondary particles adjacent to each other.

15. The method for producing a noble metal fine particle supported catalyst according to claim 14, wherein the dispersion of the support particles is mixed with the metal oxide forming sol so that a weight of the inorganic binder formed of the metal oxide forming sol is 70% or less relative to a weight of the support particles.

16. The method for producing a noble metal fine particle supported catalyst according to claim 14, wherein the dispersion of the support particles is mixed with the metal oxide forming sol so that a weight of the inorganic binder formed of the metal oxide forming sol is from 15% to 50% relative to a weight of the support particles.

17. The method for producing a noble metal fine particle supported catalyst according to claim 14, wherein the dispersion of the support particles is subjected to with at least one treatment selected from the group consisting of a crushing treatment and/or a dispersing treatment, at a time after the support particles on which the noble metal fine particles are supported are mixed with the solvent and the resultant mixture is stirred and before the dispersion of the support particles is mixed with the metal oxide forming sol.

18. The method for producing a noble metal fine particle supported catalyst according to claim 14, wherein the dispersion of the support particles is treated with a crushing treatment, at a time after the support particles on which the noble metal fine particles are supported are mixed with the solvent and the resultant mixture is stirred and before the dispersion of the support particles is mixed with the metal oxide forming sol.

19. The method for producing a noble metal fine particle supported catalyst according to claim 14,
wherein the secondary particle is an aggregate of the plurality of the support particles on which the noble metal fine particles are supported, and
the secondary particle has fine pores each formed of a gap between the support particles forming the aggregate.

* * * * *